(12) United States Patent
Kosaka et al.

(10) Patent No.: US 8,854,695 B2
(45) Date of Patent: Oct. 7, 2014

(54) IMAGE PROCESSING APPARATUS, METHOD, AND PROGRAM

(71) Applicant: Canon Kabushiki Kaisha, Tokyo (JP)

(72) Inventors: Ryo Kosaka, Tokyo (JP); Kenzou Sekiguchi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/957,862

(22) Filed: Aug. 2, 2013

(65) Prior Publication Data

US 2014/0043655 A1    Feb. 13, 2014

(30) Foreign Application Priority Data

Aug. 10, 2012   (JP) ................................ 2012-178410

(51) Int. Cl.
*H04N 1/21*    (2006.01)

(52) U.S. Cl.
CPC .............. *H04N 1/2166* (2013.01); *H04N 1/21* (2013.01)
USPC ............................ 358/403; 358/474; 358/488

(58) Field of Classification Search
None
See application file for complete search history.

(56) References Cited

U.S. PATENT DOCUMENTS

| | | | |
|---|---|---|---|
| 5,764,379 A * | 6/1998 | Matsuda et al. | 358/474 |
| 6,281,983 B1 * | 8/2001 | Takahashi et al. | 358/1.2 |
| 2011/0167081 A1 | 7/2011 | Kosaka | |
| 2013/0094068 A1 * | 4/2013 | Makino | 358/488 |

FOREIGN PATENT DOCUMENTS

JP           2006-115334           4/2006

* cited by examiner

*Primary Examiner* — Kimberly A Williams
(74) *Attorney, Agent, or Firm* — Fitzpatrick, Cella, Harper & Scinto

(57) ABSTRACT

An image processing apparatus is provided, which makes it possible to classify and store documents after scanning the documents by intuitive operations such as physically classifying the documents. The image processing apparatus according to the present invention includes an acquisition unit configured to acquire image data obtained by capturing an image of a document placed in an image capturing area; and a classification unit configured to classify the acquired image data according to at least one of a direction to which the document is framed-out from the image capturing area and a direction from which the document is framed-in to the image capturing area.

16 Claims, 17 Drawing Sheets

| CLASSIFICATION INFORMATION | | IMAGE INFORMATION | | | | |
|---|---|---|---|---|---|---|
| FRAME-OUT DIRECTION | GROUP ID | IMAGE ID | SIZE | WIDTH | HEIGHT | ... |

FIG.10A

| CLASSIFICATION INFORMATION | | IMAGE INFORMATION | | | | |
|---|---|---|---|---|---|---|
| FRAME-OUT DIRECTION | GROUP ID | IMAGE ID | SIZE | WIDTH | HEIGHT | ... |
| RIGHT (CLASSIFICATION AREA 1) | 1 | 901 | 2.0MB | $W_1$ | $H_1$ | ... |

FIG.10B

| CLASSIFICATION INFORMATION | | IMAGE INFORMATION | | | | |
|---|---|---|---|---|---|---|
| FRAME-OUT DIRECTION | GROUP ID | IMAGE ID | SIZE | WIDTH | HEIGHT | ... |
| RIGHT (CLASSIFICATION AREA 1) | 1 | 901 | 2.0MB | $W_1$ | $H_1$ | ... |
|  |  | 902 | 2.1MB | $W_2$ | $H_2$ | ... |

FIG.10C

| CLASSIFICATION INFORMATION | | IMAGE INFORMATION | | | | |
|---|---|---|---|---|---|---|
| FRAME-OUT DIRECTION | GROUP ID | IMAGE ID | SIZE | WIDTH | HEIGHT | ... |
| RIGHT (CLASSIFICATION AREA 1) | 1 | 901 | 2.0MB | $W_1$ | $H_1$ | ... |
|  |  | 902 | 2.1MB | $W_2$ | $H_2$ | ... |
| LEFT (CLASSIFICATION AREA 3) | 2 | 903 | 2.5MB | $W_3$ | $H_3$ | ... |
|  |  | 905 | 2.4MB | $W_5$ | $H_5$ | ... |
|  |  | . | . | . | . | . |
| DOWN (CLASSIFICATION AREA 4) | 3 | 904 | 3.2MB | $W_4$ | $H_4$ | ... |
|  |  | . | . | . | . | . |
|  |  | 9XX | 1.7MB | $W_x$ | $H_x$ | ... |

FIG.10D

1201
```
<?xml version="1.0"?>
<svg xmlns="http://www.w3.org/2000/svg" width="2480"height="3520"
    xmns:x="http://@@@.jp">

```

1202
```

<image x="0"y="0"width="2480"height="3520"
    xlink:href="data:image/jpeg;base64,Wrszx64ks2q42dsa2439......"/>

```

1203
```

<image x="0"y="0"width="2480"height="3520"
    xlink:href="data:image/jpeg;base64,Vrszx22ks2a43dsb2521......"/>

```

1204
```

<image x="0"y="0"width="2480"height="3520"
    xlink:href="data:image/jpeg;base64,Xrszx34ks4a45dsa3415......"/>

```

⋮

1205
```
</pages>
</svg>
</xml>
```

FIG.12

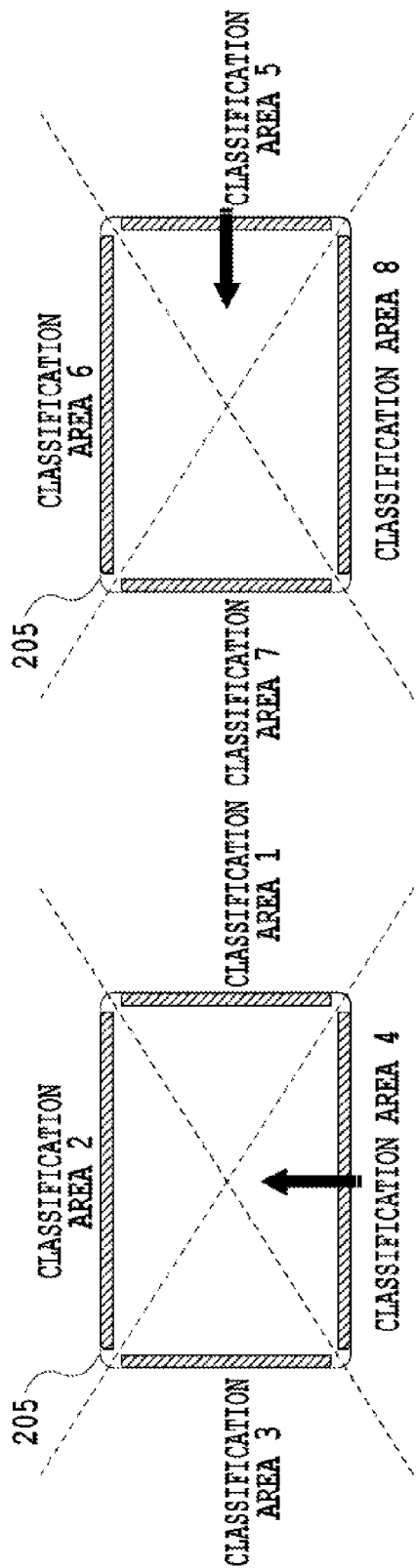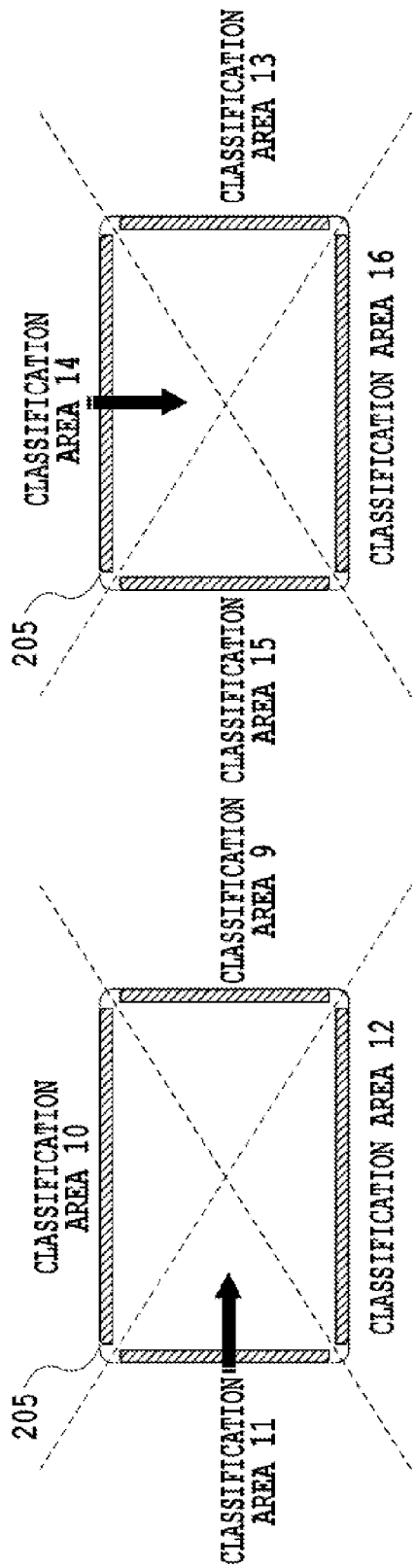

FIG.17

| CLASSIFICATION INFORMATION | | | IMAGE INFORMATION | | | | |
|---|---|---|---|---|---|---|---|
| FRAME-IN DIRECTION | FRAME-OUT DIRECTION | GROUP ID | IMAGE ID | SIZE | WIDTH | HEIGHT | |
| FRONT | RIGHT (CLASSIFICATION AREA 1) | 1 | 901 | 2.0MB | $W_1$ | $H_1$ | ... |
| | | | 902 | 2.1MB | $W_2$ | $H_2$ | ... |
| | LEFT (CLASSIFICATION AREA 3) | 3 | 903 | 2.5MB | $W_3$ | $H_3$ | ... |
| | | | 905 | 2.4MB | $W_5$ | $H_5$ | ... |
| | | | .. | .. | .. | .. | .. |
| RIGHT | DOWN (CLASSIFICATION AREA 8) | 2 | 904 | 3.2MB | $W_4$ | $H_4$ | ... |
| | | | .. | .. | .. | .. | .. |
| | | | 9XX | 1.7MB | $W_x$ | $H_x$ | ... |
| LEFT | RIGHT (CLASSIFICATION AREA 9) | 4 | 906 | 1.9MB | $W_6$ | $H_6$ | ... |
| | | | .. | .. | .. | .. | .. |
| | | | 9YY | 2.4MB | $W_y$ | $H_y$ | ... |

IMAGE PROCESSING APPARATUS, METHOD, AND PROGRAM

BACKGROUND OF THE INVENTION

1. Field of the Invention

The present invention relates to an image processing apparatus, method, and program for classifying image data.

2. Description of the Related Art

In scanning documents using a conventional multifunction printer with a flatbed scanner, it is necessary to start scanning of a document one by one. That is, users need to place the document one by one on the glass surface of the document platen (flatbed platen), open and close a cover of a document platen before and after the setting of the document, and press a scan start button. To scan a document consisting of multiple chapters and store each chapter as a separate file, it is necessary to specify an output file name for each chapter and then start scanning of the chapter for each page, which expends considerable time and effort.

For example, for a document consisting of three chapters, each consisting of three pages, each chapter may be stored in a storage device as a separate file in accordance with the following operational procedures.

Operation 1: Select [Scan and Save] from a main menu on a screen.

Operation 2: Specify an output file name of a current chapter and where to save the file.

Operation 3: Open a cover of a document platen.

Operation 4: Place a current page in a current chapter on the glass surface of the document platen.

Operation 5: Close the cover of the document platen and press a scan start button.

Operation 6: After completing the scanning of the current page in the current chapter, press a set button for another page in the current chapter, if any, and return to Operation 3 to continue scanning of the following pages in the current chapter.

Operation 7: After completing the scanning of the last page in the current chapter, press a saving setting button for another chapter in the document, if any, and return to Operation 2 to continue scanning of the pages in the following chapter in the document as well as setting of the saving.

Operation 8: After completing the scanning of the last page in the current chapter and if the current chapter is the last chapter in the document, press an end button to complete the scanning of the document.

In the above operational procedures, it is necessary to specify a file name three times and start scanning of the document for each page, which expends considerable time and effort.

In the meantime, in recent years, a camera scanner is also known as a device for capturing image data of documents, in which a camera captures an image of a document placed on a document platen and image data of the document captured by the camera is processed and stored(see, for example, Japanese Patent Laid-open No. 2006-115334). The camera scanner disclosed in Japanese Patent Laid-open No. 2006-115334 performs a motion detection processing of images on the basis of amount of change between images that indicates how much change happens between a previously-captured image and a newly-captured image. This motion detection processing allows detection of timing at which a document is placed on a document platen and gets still. A document portion is recognized and extracted from image data captured at the detected timing and stored in a storage device as document image data after image processing such as projection correction and scaling is performed on the document portion, and then an image is projected using a projector.

The above-described camera scanner can save users from having to open and close a cover as compared to a conventional multifunction printer with a flatbed scanner. In addition, the above-described camera scanner can save users from having to press a scan start button since the timing at which an image of a document is captured is detected.

However, the above-described camera scanner requires a significant time and effort in storing a series of documents as separate files, as the conventional multifunction printer with a flatbed scanner. That is, it is necessary to repeat scanning operations for each output file or to divide a file using a PC or the like in post-processing.

It is an object of the present invention to provide an image processing apparatus which makes it possible to classify and store documents after scanning the documents by intuitive operations such as physically classifying the documents.

SUMMARY OF THE INVENTION

An image processing apparatus according to the present invention comprising an acquisition unit configured to acquire image data obtained by capturing an image of a document placed in an image capturing area; and a classification unit configured to classify the acquired image data according to at least one of a direction to which the document is framed-out from the image capturing area and a direction from which the document is framed-in to the image capturing area.

According to an aspect of the present invention, it is possible to classify scanned documents into groups according to frame-out directions of the documents, which requires only a simple operation, not a special button operation, to classify image data obtained by capturing images of the documents.

Further features of the present invention will become apparent from the following description of exemplary embodiments (with reference to the attached drawings).

BRIEF DESCRIPTION OF THE DRAWINGS

FIG. 10A shows an exemplary classification information management table;

FIG. 10B shows an exemplary classification information management table;

FIG. 10C shows an exemplary classification information management table;

FIG. 10D shows an exemplary classification information management table;

FIG. 12 shows an exemplary format of a multi-page document;

FIG. 16A is a view illustrating a frame-in direction/frame-out direction and document classification areas in accordance with a third embodiment;

FIG. 16B is a view illustrating a frame-in direction/frame-out direction and document classification areas in accordance with the third embodiment;

FIG. 16C is a view illustrating a frame-in direction/frame-out direction and document classification areas in accordance with the third embodiment;

FIG. 16D is a view illustrating a frame-in direction/frame-out direction and document classification areas in accordance with the third embodiment; and FIG. 17 shows an exemplary classification information management table in accordance with the third embodiment.

DESCRIPTION OF THE EMBODIMENTS

Hereinafter, preferable embodiments for carrying out the present invention will be described with reference to the drawings.

[First Embodiment]

Figure 1:
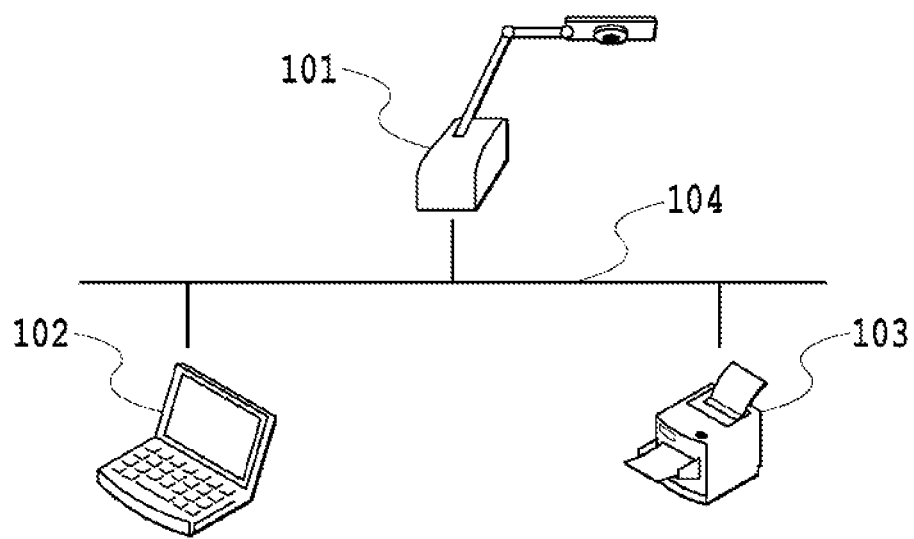
FIG. 1 shows an exemplary configuration of a network including a camera scanner 101.

FIG. 1 shows a configuration of a network including a camera scanner 101 in accordance with an embodiment of the present invention.

As shown in FIG. 1, the camera scanner 101 is connected with a host computer 102 and a printer 103 via a network 104 such as Ethernet®. In the network configuration of FIG. 1, it is possible to perform a scan function of the camera scanner 101 for capturing images and a print function of the printer 103 for outputting scanned data according to instructions from the host computer 102. Further, it is also possible to perform the scan function and the print function by sending instructions directly to the camera scanner 101, not via the host computer 102.

<Configuration of the Camera Scanner>

Figure 2:
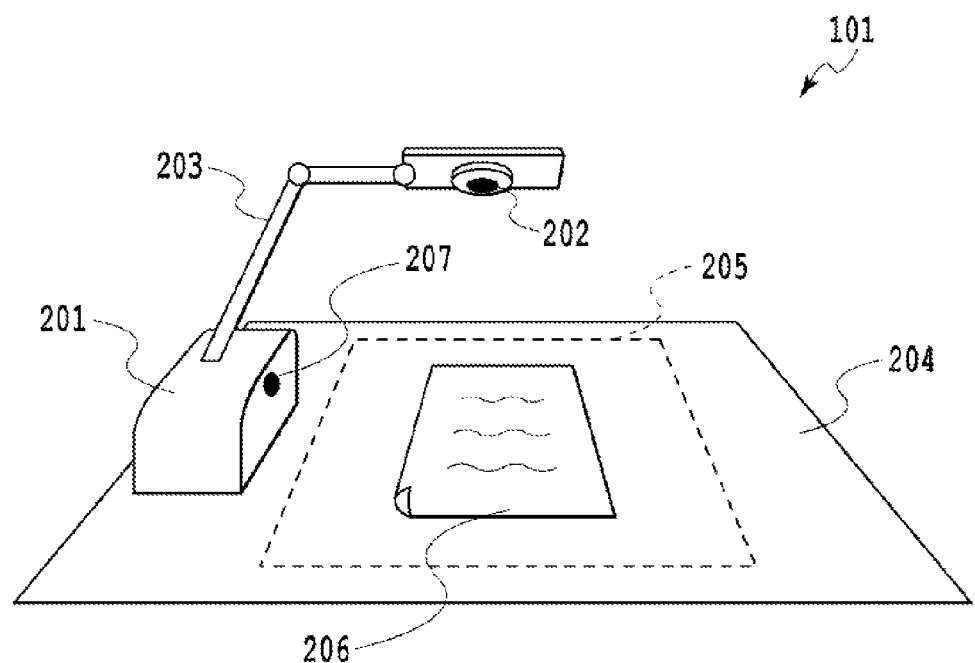
FIG. 2 shows an exemplary configuration of the camera scanner 101.

FIG. 2 shows an exemplary configuration of the camera scanner 101 in accordance with an embodiment of the present invention.

As shown in FIG. 2, the camera scanner 101 includes a controller unit 201, a camera unit 202, and an arm portion 203. The controller unit 201, which is a main body of the camera scanner, and the camera unit 202 for capturing images are connected via the arm portion 203. The arm portion 203 can bend and stretch by using its joint.

FIG. 2 shows also a document platen 204 on which the camera scanner 101 is mounted. A lens of the camera unit 202 is directed to the document platen 204 to capture an image in an image capturing area 205 as surrounded by a broken line in FIG. 2. In the example of FIG. 2, a document 206 is placed inside the image capturing area 205 and can be captured by the camera scanner 101.

The camera unit 202 may be configured to capture images in a single resolution, but more preferably, it is configured to capture images in high and low resolutions. In accordance with an embodiment of the present invention, the controller unit 201 uses a camera image captured by the camera unit 202 in low resolution to detect timing at which the document is placed inside the image capturing area and gets still, and once the timing is detected, controls the camera unit 202 to capture an image of the still document in high resolution. The controller unit 201 further uses the camera image captured by the camera unit 202 in low resolution to detect timing at which the document is framed-in to the image capturing area 205 (frame-in timing) and/or timing at which the document is framed-out from the image capturing area 205 (frame-out timing). Then, the controller unit 201 detects a direction from which the document is framed-in to the image capturing area 205 (frame-in direction) and/or a direction to which the document is framed-out from the image capturing area 205 (frame-out direction), and automatically classifies the document according to the directions.

Incidentally, the camera scanner 101 may further include a short-focus projector 207 for projecting images which assist operations on the document platen or the like. Although not shown in FIG. 2, the camera scanner 101 may further include an LCD touch panel 330 and a speaker 340.

<Hardware Configuration of the Controller of the Camera Scanner>

Figure 3:
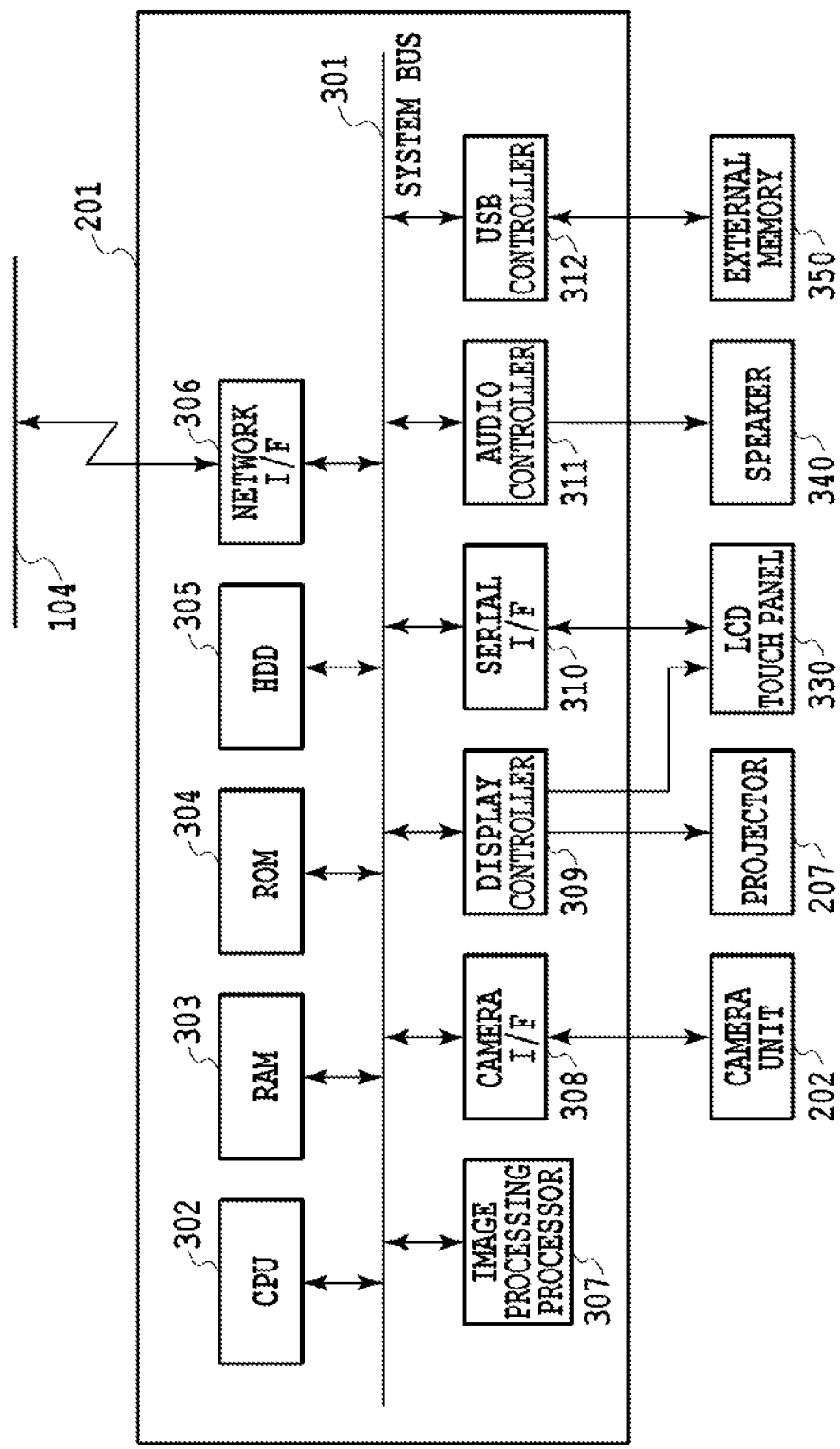
FIG. 3 shows an exemplary hardware configuration of a controller unit 201.

FIG. 3 shows an exemplary hardware configuration of the controller unit 201, which is a main body of the camera scanner 101.

As shown in FIG. 3, the controller unit 201 includes a CPU 302, a RAM 303, a ROM 304, an HDD 305, a network I/F 306, an image processing processor 307, and a camera I/F 308 which are connected with a system bus 301.

The CPU 302 is a central processing unit for controlling the entire operations of the controller unit 201. The RAM 303 is volatile memory. The ROM 304 is nonvolatile memory and stores a boot program of the CPU 302. The HDD 305 is a hard disk drive having a large capacity as compared to the RAM 303. A control program for controlling the camera scanner 101, which is executed by the controller unit 201, is stored in the HDD 305.

Upon startup, e.g., when power is switched on, the CPU 302 executes a boot program which is stored in the ROM 304. This boot program reads out the control program stored in the HDD 305 and expands it in the RAM 303. After executing the boot program, the CPU 302 then executes the control program expanded in the RAM 303 for control. Further, the CPU 302 also stores data used for operations under the control program in the RAM 303 for reading and writing. In the HDD 305, various settings necessary for operations under the control program and image data generated by camera inputs can also be stored, which are read and written by the CPU 302. The CPU 302 communicates with other units on the network 104 via the network I/F 306.

The image processing processor 307 reads and processes the image data stored in the RAM 303, and writes it back to the RAM 303. Incidentally, image processing performed by the image processing processor 307 includes rotation, scaling, and color conversion.

The camera I/F 308 is connected with the camera unit 202, obtains the image data from the camera unit 202 according to instructions from the CPU 302, and writes it into the RAM 303. Further, the camera I/F 308 transmits a control command received from the CPU 302 to the camera unit 202 and performs setting of the camera unit 202.

The controller unit 202 may further include at least one of a display controller 309, a serial I/F 310, an audio controller 311, and a USB controller 312.

The display controller 309 controls displays of image data on a display according to instructions from the CPU 302. Here, the display controller 309 is connected with the short-focus projector 207 and the LCD touch panel 330.

The serial I/F 310 inputs and outputs serial signals. Here, the serial I/F 310 is connected with the LCD touch panel 330, and once the LCD touch panel 330 is pressed, the CPU 302 obtains pressed coordinates through the serial I/F 310.

The audio controller 311 is connected with the speaker 340, converts audio data into analog audio signals according to instructions from the CPU 302, and outputs speech through the speaker 340.

The USB controller 312 controls an external USB device according to instructions from the CPU 302. Here, the USB controller 312 is connected with external memory 350 such as USB memory or an SD card, and performs reading/writing of data from/to the external memory.

<Functional Configuration of the Camera Scanner Control Program>

Figure 4:
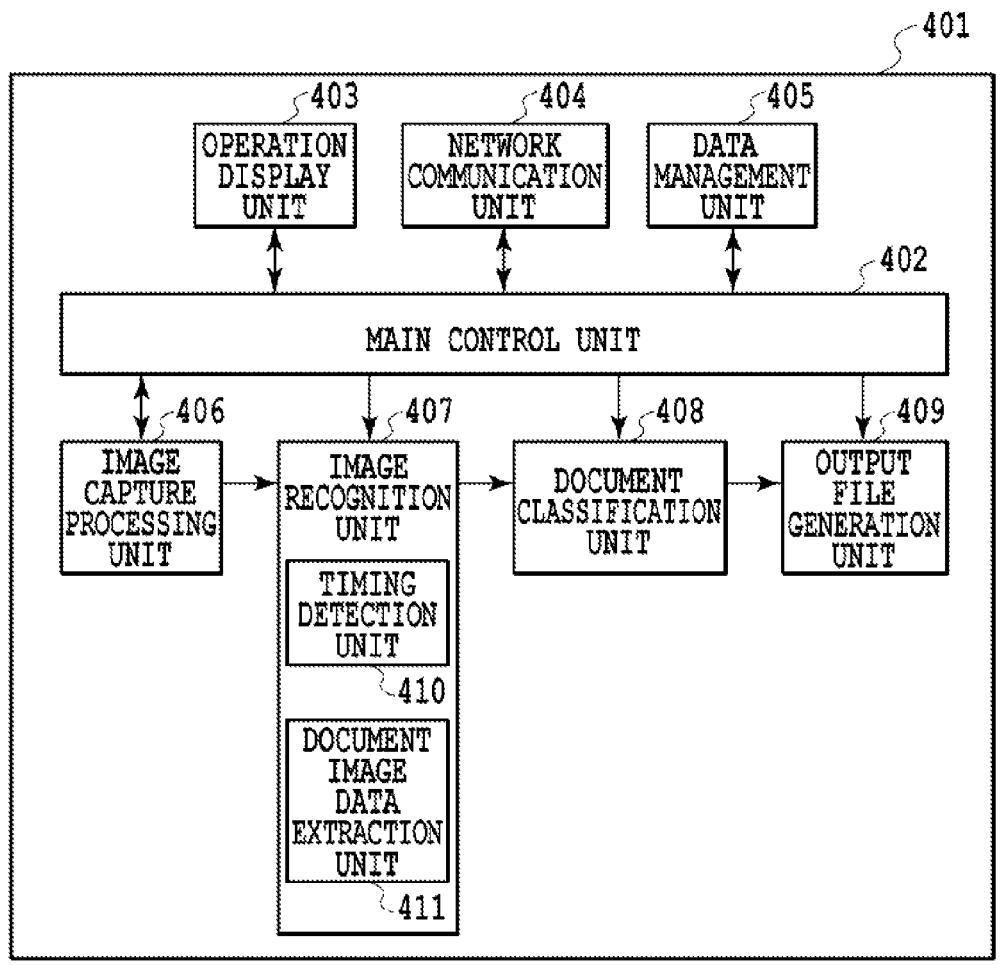
FIG. 4 shows an exemplary functional configuration of a control program for controlling the camera scanner 101.

FIG. 4 shows a functional configuration 401 of a control program executed by the CPU 302 for controlling the camera scanner 101.

The control program for controlling the camera scanner 101 is stored in the HDD 305 as described above and the CPU 302 expands and executes the control program in the RAM 303 upon startup. The functional configuration 401 of the control program for controlling the camera scanner 101 includes a main control unit 402, an operation display unit 403, a network communication unit 404, a data management unit 405, an image capture processing unit 406, an image recognition unit 407, a document classification unit 408, and an output file generation unit 409. The image recognition unit 407 includes a document image data extraction unit 411 and a timing detection unit 410.

The main control unit 402 has control over the units in the functional configuration 401.

The operation display unit 403 receives a rendering request from the main control unit 402 and performs rendering to the short-focus projector 207 or the LCD touch panel 330 via the display controller 309. Further, the operation display unit 403 receives pressed coordinates via the serial I/F 310 when the LCD touch panel 330 is pressed, and determines an operation content (e.g., a pressed button) by associating a content of the operation screen during rendering with the pressed coordinates. The operation content is sent to the main control unit 402 to accept operator's operations.

The network communication unit 404 communicates with other units on the network 104 via the network I/F 306 using TCP/IP.

The data management unit 405 stores and manages work data generated in the execution of the control program 401, for example, document image data extracted in the document image data extraction unit, which will be described later, and a classification information management table generated in the document classification unit in a predetermined area in the HDD 305.

The image capture processing unit 406 controls the camera unit 202 via the camera I/F 308 and transmits the obtained camera image to the image recognition unit 407. Once the timing at which a document gets still is detected, which will be described later, the image capture processing unit 406 controls the camera unit 202 so as to capture an image of the document in high resolution.

The image recognition unit 407 receives the camera image from the camera unit 202 and recognizes the content of the received camera image. As shown in FIG. 4, the image recognition unit 407 includes the timing detection unit 410 and the document image data extraction unit 411.

The timing detection unit 410 detects timing at which a document is framed-in (frame-in timing), timing at which a document gets still (still timing), and timing at which a document is framed-out (frame-out timing). The timing may be detected on the basis of the camera image received from the camera unit 202. Here, the frame-out timing may be just before the document is framed-out from the image capturing area, or just when the document begins to be framed-out from the image capturing area, or any timing therebetween. Hereinafter, using an example of just before the document is framed-out from the image capturing area, the description will be given.

The document image data extraction unit 411 extracts document image data from the camera image captured at the still timing detected by the timing detection unit 410. The extracted document image data is stored in a predetermined area in the HDD 305 and managed by the data management unit 405.

The document classification unit 408 includes a direction detection unit (not shown) configured to detect a frame-out direction and/or a frame-in direction on the basis of the camera image captured at the frame-in timing and/or just before the frame-out timing as detected by the timing detection unit 410. Then, the document classification unit 408 classifies the documents according the frame-out direction and/or the frame-in direction as detected, and generates a classification information management table to manage the documents by associating document image information with the frame-out direction and/or the frame-in direction.

The output file generation unit 409 converts the document image data stored by the data management unit 405 to prepare an appropriate image, and generates an output file in a predetermined data output format by referring to the classification information management table generated by the document classification unit 408.

Figure 5A:
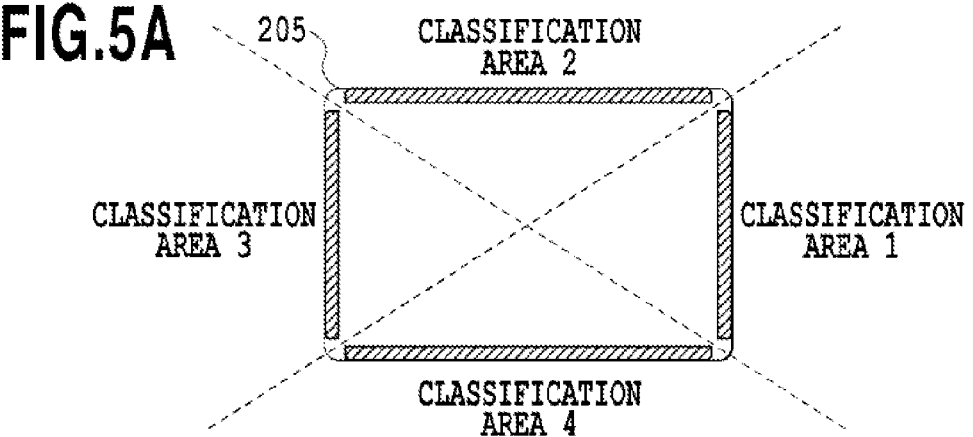
FIG. 5A is a view illustrating frame-out directions and document classification areas.
Figure 5B:
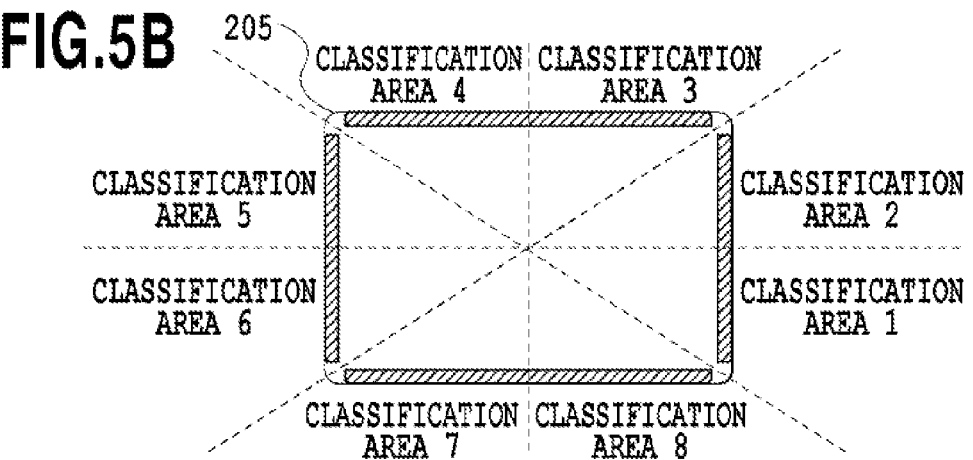
FIG. 5B is a view illustrating frame-out directions and document classification areas.
Figure 5C:
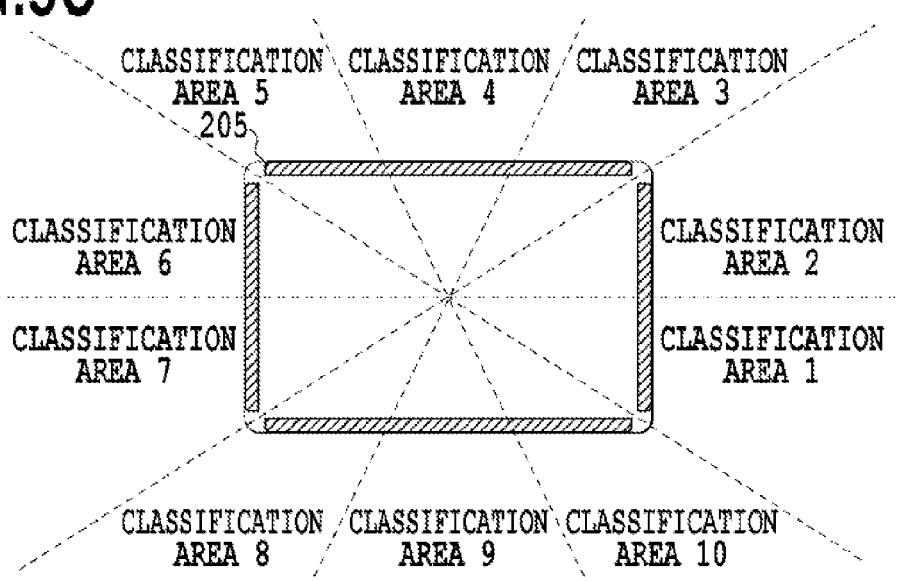
FIG. 5C is a view illustrating frame-out directions and document classification areas.

FIGS. 5A to 5C are views illustrating frame-out directions of documents and document classification areas. Referring to FIGS. 5A to 5C, a way of classifying the document 206 which is framed-out from the image capturing area 205 will be described.

In FIG. 5A, documents may be classified under four areas, classification area 1 to classification area 4, by setting four directions (right, left, front, and back) to which the documents is framed-out from the image capturing area 205. As shown in FIGS. 5B and 5C, it is possible to increase the number of classifications by setting more frame-out directions. Hereinafter, the processing in adopting the frame-out pattern of FIG. 5A which allows up to four classifications will be described.

Figure 6:
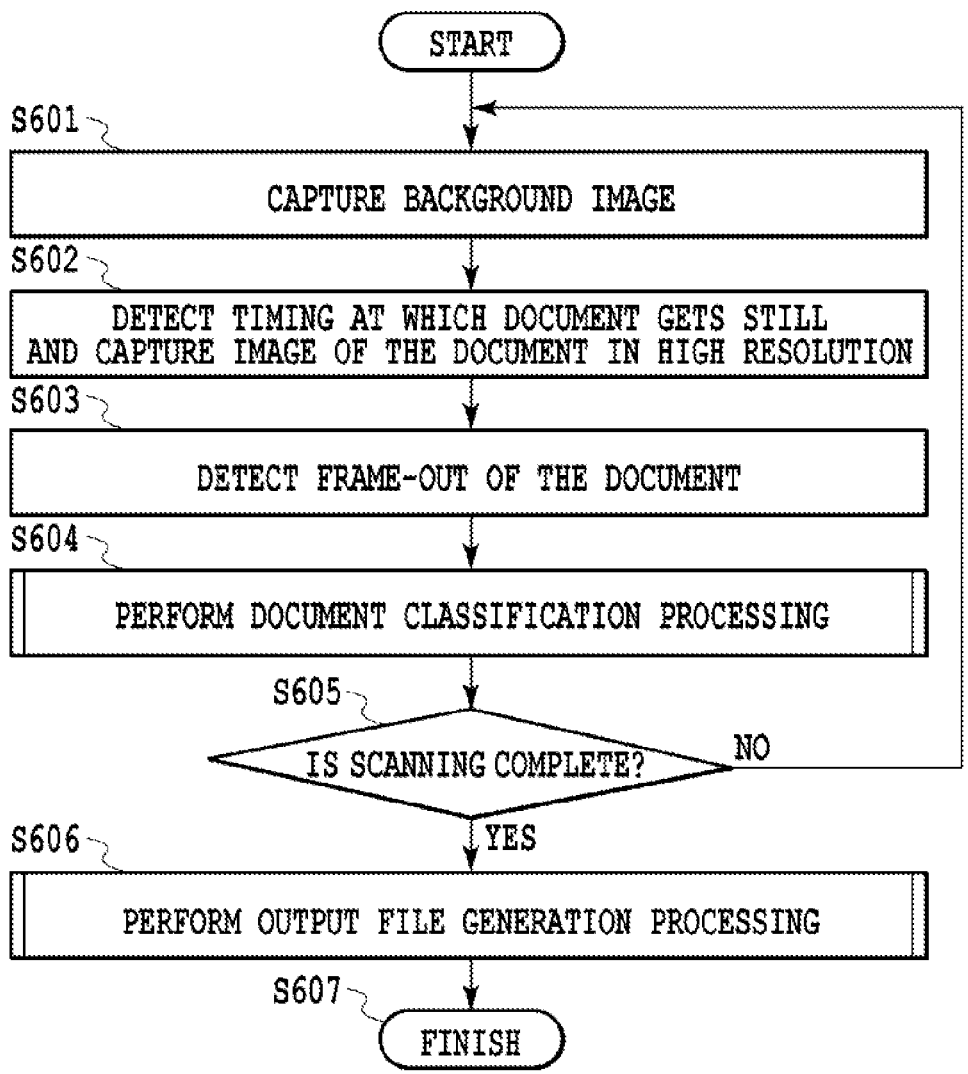
FIG. 6 is a flow chart of exemplary processing performed by a camera scanner in accordance with a first embodiment.

FIG. 6 is a flow chart of processing performed by the camera scanner 101 in accordance with the present embodiment.

In S601 of FIG. 6, an image of the image capturing area 205 is captured in a state without the document 206 placed therein as a background image, and the captured image is stored in the HDD 305. The camera unit 202 keeps capturing the image capturing area 205 for timing detection, and the captured camera image is transmitted to the image recognition unit 407.

In S602, the timing detection unit 410 in the image recognition unit 407 detects timing at which the document 206 get still after being framed-in to the image capturing area 205 on the basis of the camera image received from the camera unit 202. Once the still timing is detected, the image capture processing unit 406 captures an image of the document 206 in high resolution by controlling the camera unit 202. The document image data extraction unit 411 in the image recognition unit 407 extracts document image data from the camera image captured at the timing at which the document 206 gets still. The extracted document image data is stored in the HDD 305 by the data management unit 405. Here, the timing at which the document gets still can be detected on the basis of amount of change between images. For example, in a case where amount of change between images that indicates how much change happens between a previously-captured image and a newly-captured image is equal to or smaller than a predetermined threshold, it is determined that the document gets still.

In S603, the timing detection unit 410 in the image recognition unit 407 detects timing just before the document 206, image of which has been captured, is framed-out from the image capturing area 205 (frame-out timing) on the basis of the camera image received from the camera unit 202. Here, by comparing the received camera image with the background image, it is possible to detect the timing just before the frame-out timing. For example, the timing just before the frame-out timing is detected as the timing just before a difference between the received camera image and the background image becomes equal to or smaller than a predetermined percentage.

In S604, the document classification unit 408 detects a frame-out direction of the document and performs classification processing for classifying the document according to the detected frame-out direction. The document classification processing will be described later in detail.

In S605, the main control unit 402 determines whether scanning of all the documents has been completed. In a case where the scanning is to be continued, the process goes back to S601, and in a case where the scanning is completed, the process proceeds to S606. Incidentally, scanning is completed according to a scan end instruction as sent from the host computer 102 via the network I/F 306 or an end instruction as entered through the LCD touch panel 330.

In S606, the output file generation unit 409 converts the document image data extracted and stored in S602 to a predetermined data format on the basis of a classification result recognized in S604 and outputs it. The details of the output data generation processing will be described later. The output data is stored in the external memory 350 such as an SD card or USB memory. Alternatively, the output data may be transmitted to another unit which is connected to the network 104 via the network I/F 306.

Figure 7:
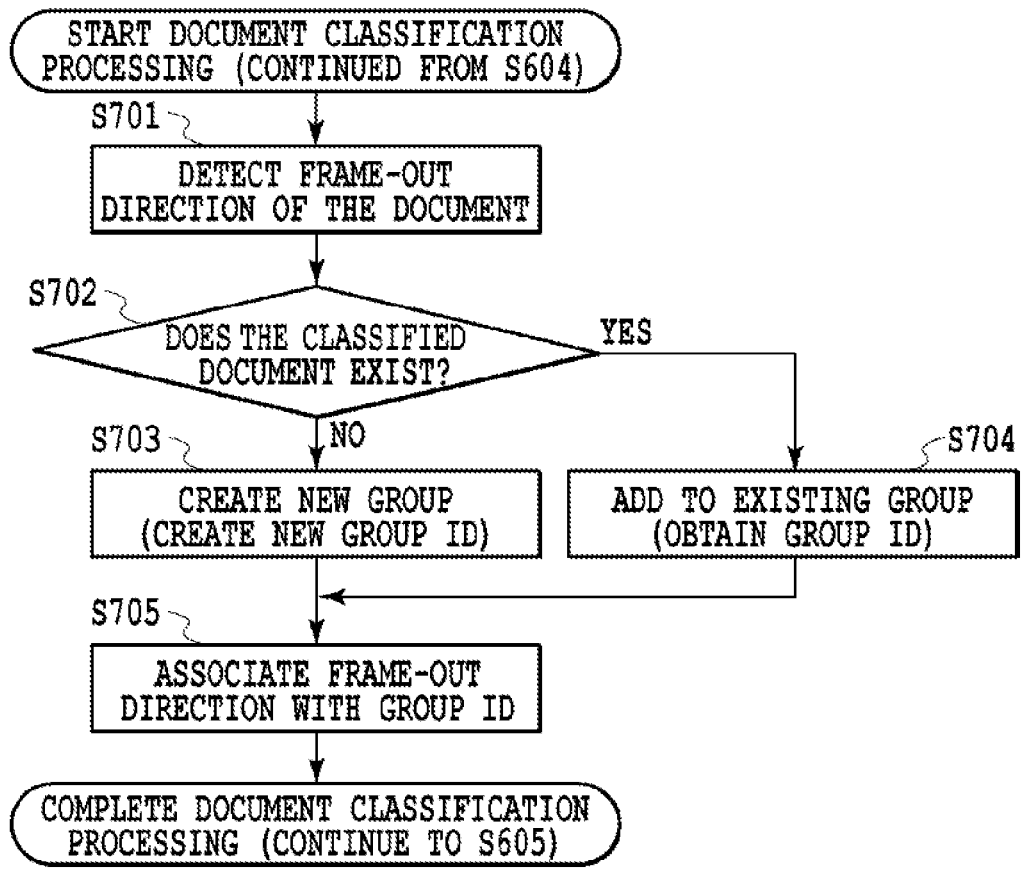
FIG. 7 is a flow chart of an exemplary document classification process in accordance with the first embodiment.

With reference to FIGS. 7 to 10D, the document classification processing in S604 will be described in detail. FIG. 7 is a flow chart of the document classification processing in accordance with the present embodiment. FIGS. 8A to 8E are views illustrating methods of detection of a frame-out direction of a document. FIGS. 9A to 9D are views illustrating exemplary operations of frame-out actions and classification of documents. FIGS. 10A to 10D show exemplary classification information tables used to manage the documents by associating document image information with frame-out directions.

Hereinafter, using the flow chart of the processing shown in FIG. 7, a process of classifying multiple documents as shown in FIGS. 9A to 9D will be described.

Figure 9A:
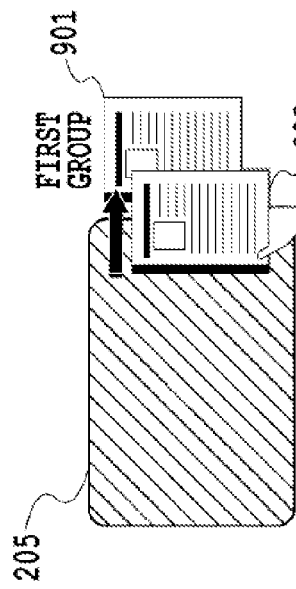
FIG. 9A is a view illustrating an exemplary operation of a frame-out action and classification of documents.

First, the document classification processing for a first document 901 as shown in FIG. 9A will be described.

In S701 of FIG. 7, the document classification unit 408 generates a differential image between the background image captured in S601 and the image captured at timing just before the frame-out timing as detected in S603, and detects a frame-out direction based on the generated differential image.

Figure 8A:
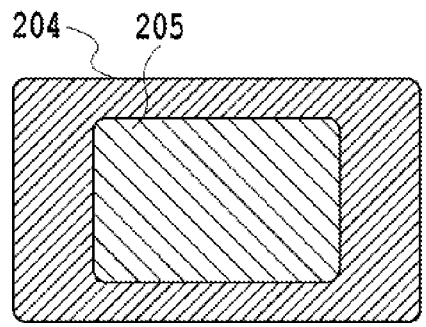
FIG. 8A is a view illustrating an exemplary method of detection of a frame-out direction.
Figure 8B:
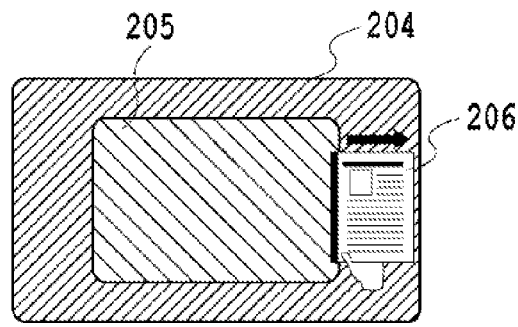
FIG. 8B is a view illustrating an exemplary method of detection of a frame-out direction.
Figure 8C:
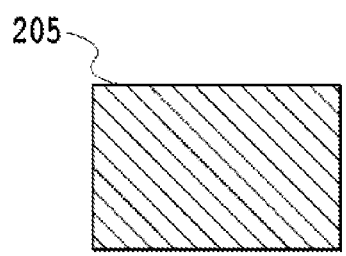
FIG. 8C is a view illustrating an exemplary method of detection of a frame-out direction.
Figure 8D:
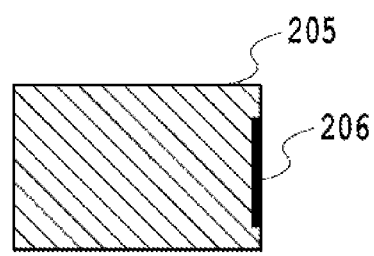
FIG. 8D is a view illustrating an exemplary method of detection of a frame-out direction.
Figure 8E:
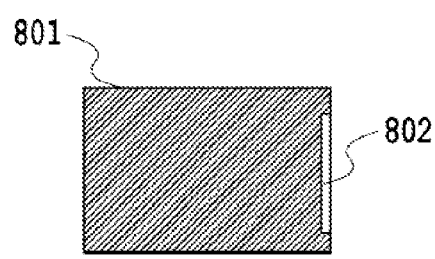
FIG. 8E is a view illustrating an exemplary method of detection of a frame-out direction.

FIGS. 8A to 8E show exemplary methods of detection of a frame-out direction. FIG. 8A illustrates the document platen 204 before a document is placed. FIG. 8C illustrates a captured background image. FIG. 8B illustrates the document platen 204 just before the document 206 is framed-out from the image capturing area 205. FIG. 8D illustrates an image captured at the timing just before the document 206 is framed-out from the image capturing area 205. The document classification unit 408 generates a differential image of FIG. 8E on the basis of these two captured images. A black area 801 in the differential image represents a portion without change, and a white portion 802 represents an end portion of the document 206 which is being framed-out. Then, it is determined which classification area defined in FIG. 5A includes the document end portion 802. In this case, the end portion is included in the area on the right side, and accordingly it is determined that the document is framed-out to the classification area 1. Incidentally, the frame-out direction may be detected by other methods such as calculation using a movement path of the center of the document.

By applying the above-described method to the first document 901 as shown in FIG. 9A, it can be detected that the first document 901 is being framed-out to the right side of the image capturing area 205 (classification area 1).

In S702, the document classification unit 408 determines, using the classification information management tables as shown in FIGS. 10A to 10D, whether there is any document which has already been classified in the current frame-out direction. In a case where it is determined that some documents exist in the current frame-out direction, the process proceeds to S704, and in a case where it is determined that no document exists, the process proceeds to S703. Incidentally, the classification information management tables are used to manage the documents by associating frame-out directions and group IDs, which are classification information, with the image information on the document image data extracted in S602.

When the first document 901 is placed, a classification information management table does not include data as shown in FIG. 10A, and thus the process proceeds to S703.

In S703, the document classification unit 408 gives a new group ID to the frame-out direction. Here, a new group ID "1" is assigned to the right side (classification area 1).

In S705, the document classification unit 408 associates the classification information (frame-out direction and group ID) obtained in S703 with the image information on the document image data extracted in S602, and adds them to the classification information management table. FIG. 10B shows a classification information management table after adding. Then, the classification processing for the first document 901 is completed, and the process proceeds to S605. Then, the process goes back to S601 for documents to be scanned.

Figure 9B:
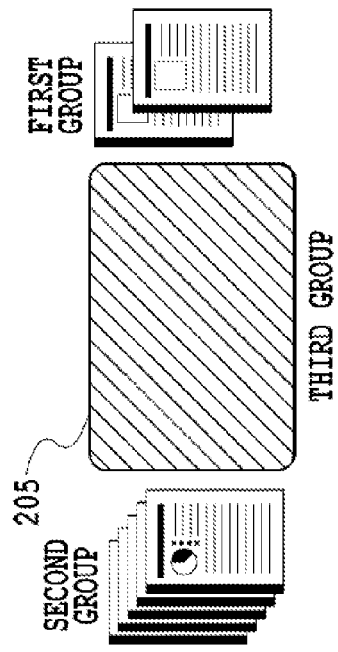
FIG. 9B is a view illustrating an exemplary operation of a frame-out action and classification of documents.

Then, the document classification processing for a second document 902 as shown in FIG. 9B will be described.

In S701, the document classification unit 408 detects that a frame-out direction of the document 902 is the right side of the image capturing area 205 (classification area 1).

In S702, the document classification unit 408 refers to the classification information management table as shown in FIG. 10B and determines that the classified document already exists on the right side (classification area 1). Then, the process proceeds to S704.

In S704, the document classification unit 408 obtains a group ID which is associated with the frame-out direction. Here, the group ID "1" which is associated with the right side (classification area 1) is obtained.

In S705, the document classification unit 408 associates the classification information (frame-out direction and group ID) obtained in S704 with the image information on the document 902 captured in S602 and describes them on the classification information management table. FIG. 10C shows a classification information management table after adding.

Figure 9C:
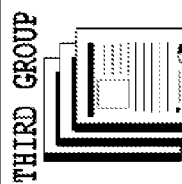
FIG. 9C is a view illustrating an exemplary operation of a frame-out action and classification of documents.
Figure 9D:
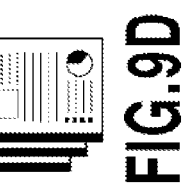
FIG. 9D is a view illustrating an exemplary operation of a frame-out action and classification of documents.

Next, as shown in FIG. 9C, it is possible to similarly classify documents by performing distribution processing on the third and subsequent documents. FIG. 9D shows the condition of document classification on the document platen 204 after scanning is completed. FIG. 10D shows a final classification information management table generated.

In the above description, a new group ID is given in a case where it is determined that no classified document exist in a frame-out direction with reference to the classification information management table. However, it is also possible to give a new group ID according to a change in frame-out direction of the detected document, without referring to the classification information management table, which allows the document classification without a limit to the number of classifications.

Here, the order of classification may be determined according to the placing order of the documents by associating classification areas with group IDs for classification according to the frame-out order of the documents. Obviously, however, group IDs may be assigned in advance to the classification areas as shown in FIG. 5A, 5B, or 5C, and the order of classification may be determined according to where the document is placed.

Next, referring to FIGS. 11A to FIG. 13, output file generation processing in S606 will be described.

Figure 11A:
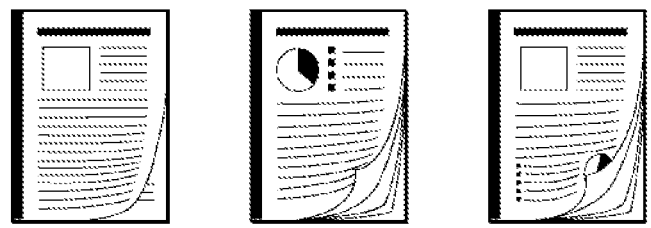
FIG. 11A is a view showing an output file format.
Figure 11B:
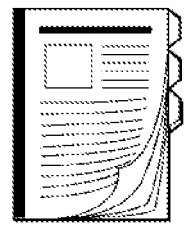
FIG. 11B is a view showing an output file format.
Figure 11C:
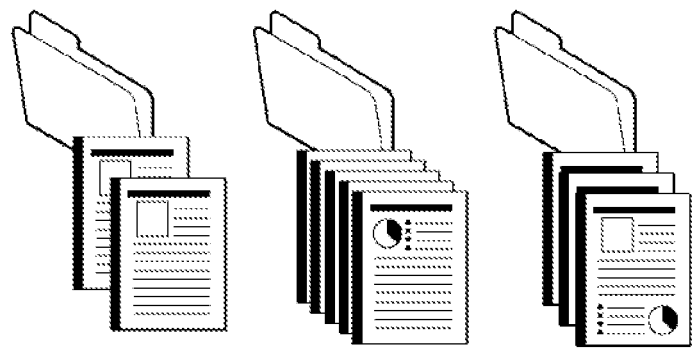
FIG. 11C is a view showing an output file format.

The documents classified as FIG. 9D may be outputted in various formats (data output formats) as shown in FIGS. 11A to 11C. For example, in FIG. 11A, the classified documents are converted into a document file consisting of multiple pages, such as a multi-page PDF, for each group and outputted. That is, a separate file for each group of classified documents is outputted. As shown in FIG. 11B, it is also possible to merge all of the data into one multi-page document file, and split the document file by an internal structure, such as chapters or bookmarks. That is, the classified documents may be merged into a single file and split by an internal structure. Further, as shown in FIG. 11C, it is also possible to create a folder for each group of classified documents, and store them in the folder as a separate document file, such as a single-page PDF or a JPEG image file. That is, respective groups of classified documents are placed into folders and outputted.

FIG. 12 shows an exemplary description of a text file in an XML format as an example of the multi-page document file format shown in FIG. 11A. A multi-page document file consists of a header description 1201 which is inserted to the top of the output file, electronic document page descriptions 1202-1204 for the description of the captured document for each page, and a footer description 1205 indicating the end of description of the file.

Figure 13:
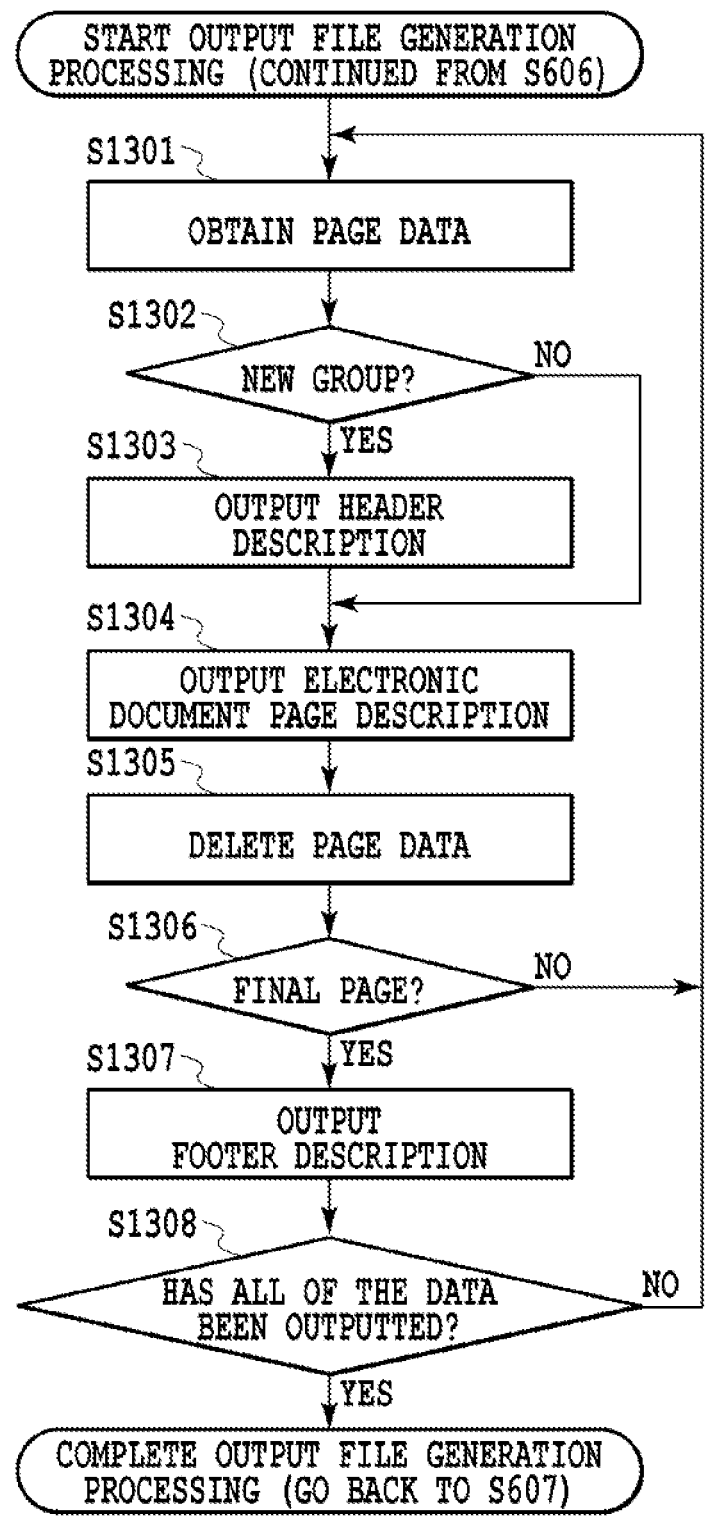
FIG. 13 is a flow chart of exemplary processing for generating an output file.

FIG. 13 shows a process of outputting a multi-page document file.

In S1301 of FIG. 13, the output file generation unit 409 obtains page data including a group ID and image information from the classification information management table shown in FIG. 10D.

In S1302, the output file generation unit 409 determines whether the obtained page data is a new group. In a case where the data belongs to a new group, the process proceeds to S1303, and in a case where the data belongs to the same group, the process proceeds to S1304.

In S1303, the output file generation unit 409 outputs the header description 1201 for generating a new multi-page document file.

In S1304, the output file generation unit 409 reads the image data managed in the data management unit 405 from the RAM 303 and describes it as the electronic document page description 1202.

In S1305, the data management unit 405 deletes the image data after it is written to an output file from the RAM 303.

In S1306, the output file generation unit 409 determines whether the page data obtained in S1301 is the final page in the group. In a case where it is the final page, the process proceeds to S1307, and in a case where it is not the final page, the process goes back to S1301.

In S1307, the output file generation unit 409 outputs the footer description 1205 indicating the end of a file and generates an output file.

In S1308, the output file generation unit 409 determines whether all of the page data classified in the classification information management table has been outputted. In a case where it is determined that all of the page data has not been outputted, the process goes back to S1301, and in a case where it is determined that all of the page data has been outputted, the output file generation processing is completed.

According to the above-described processing, the captured document 206 can be classified and stored automatically by changing the direction to which the document 206 is framed-out from the image capturing area 205, thereby increasing operability.

[Second Embodiment]

In the first embodiment, all of the captured images were classified according to frame-out directions. In the present embodiment, frame-in directions are used in addition to the frame-out directions so that images may be deleted in a case where images of unnecessary documents are captured by mistake or images are captured in failure.

Figure 14:
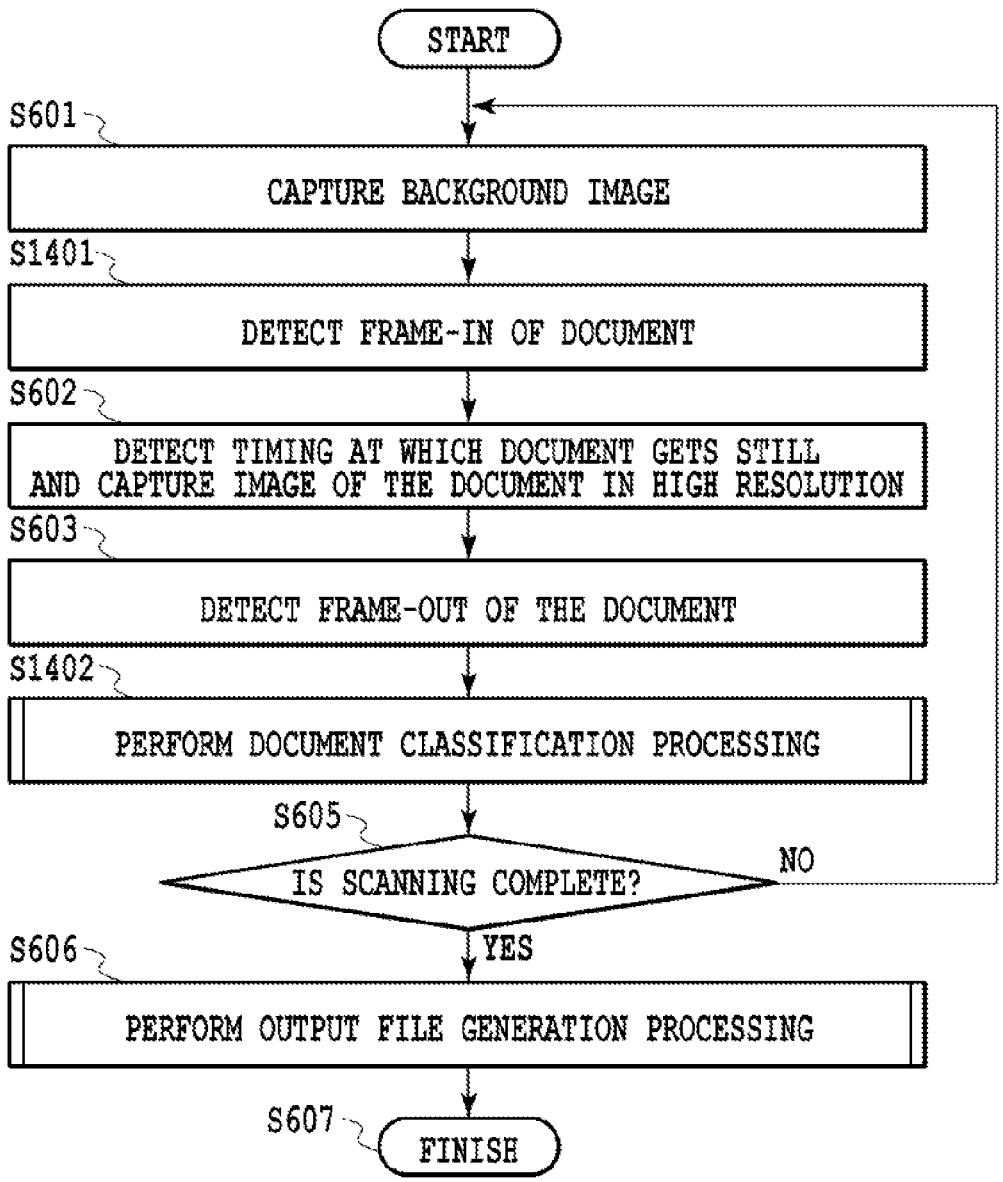
FIG. 14 is a flow chart of exemplary processing performed by a camera scanner in accordance with a second embodiment.

With reference to FIG. 14, the processing in accordance with the present embodiment will be described.

In S601, an image of the image capturing area 205 is captured in a state without the document 206 placed therein as a background image, and the captured image is stored in the HDD 305. The camera unit 202 keeps capturing the image capturing area 205 for timing detection, and the captured camera image is transmitted to the image recognition unit 407.

In S1401, the timing detection unit 410 in the image recognition unit 407 detects timing at which the document 206 has framed-in to the image capturing area 205 (frame-in timing) on the basis of the camera image received from the camera unit 202. Here, by comparing the received camera image with the background image, it is possible to detect the frame-in timing of the document. For example, the frame-in timing is detected as the timing at which a difference between the received camera image and the background image becomes equal to or greater than a predetermined percentage.

In S602, the timing detection unit 410 in the image recognition unit 407 detects timing at which the document 206 gets still after being framed-in to the image capturing area 205 on the basis of the camera image received from the camera unit 202. Once the still timing is detected, the image capture processing unit 406 captures an image of the document 206 in high resolution by controlling the camera unit 202.

In S603, the timing detection unit 410 in the image recognition unit 407 detects timing just before the document 206 is framed-out from the image capturing area 205.

In S1402, the document classification unit 408 uses the image captured at the frame-in timing as detected in S1401 and the image captured at the timing just before the frame-out timing as detected in S603 to perform the document classification processing.

Since the processing from S605 to S607 is performed in the same manner as the first embodiment, the description of S605 to S607 will be omitted.

Figure 15:
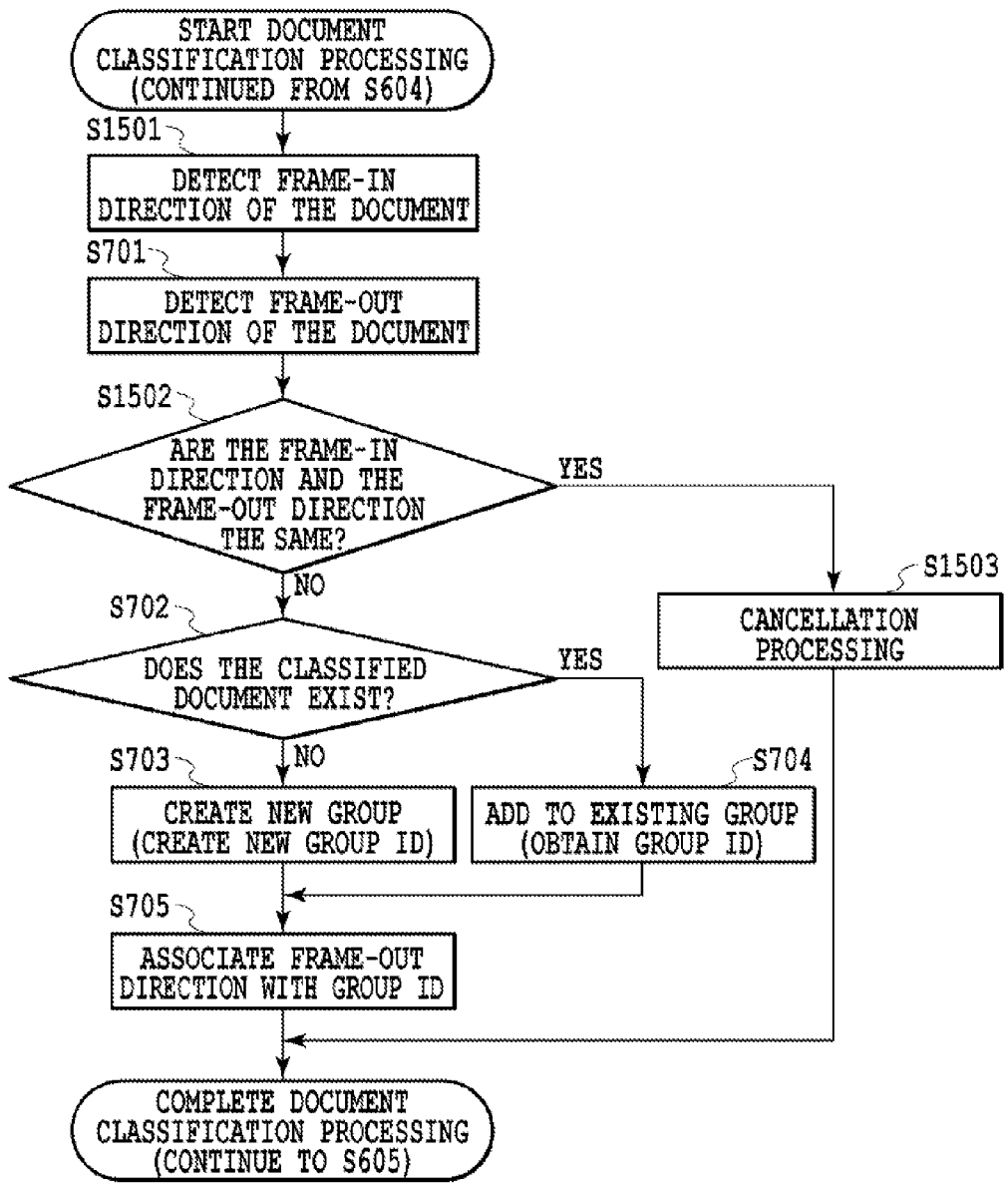
FIG. 15 is a flow chart of an exemplary document classification process in accordance with the second embodiment.

With reference to FIG. 15, the document classification processing according to the present embodiment will be described.

In S1501, the document classification unit 408 detects from which direction the document 206 is framed-in to image capturing area 205.

In S701, the document classification unit 408 detects to which direction the document 206 is framed-out from the image capturing area 205.

Incidentally, the detection of frame-in and frame-out directions may be performed in the same manner as the above-described detection of frame-out directions.

In S1502, the document classification unit 408 compares the frame-in direction with the frame-out direction as detected in S1501 and S701. In a case where the frame-in direction and the frame-out direction are different, the process proceeds to S702 and the processing is performed in the same manner as in the first embodiment. In a case where the frame-in direction corresponds with the frame-out direction, the process proceeds to S1503.

In S1503, the document classification unit 408 performs cancellation processing on the last captured image. In this processing, the last document image data stored by the data management unit 405 is deleted from the HDD 305, that is, the last document image data is omitted from the image data which is used in generating the output file, and the document classification processing is completed.

Since the processing from S702 to S705 is performed in the same manner as in the first embodiment, the description of S702 to S705 will be omitted.

In accordance with the above processing, it is possible to easily cancel images in a case where images of unnecessary documents are captured by mistake or images are captured in failure by causing the document 206 to be framed-out to the frame-in direction, thereby increasing operability.

[Third Embodiment]

In the first and second embodiments, documents were classified only according to frame-out directions. In the present embodiment, classification may be changed according to combinations of frame-in and frame-out directions.

With reference to FIGS. 16A to 16D, a way of classifying files in accordance with the present embodiment will be described.

Arrows in FIGS. 16A to 16D represent frame-in directions of the document 206, and the diagonally shaded areas represent areas which detect frame-out directions.

As shown in FIG. 16A, in a case where the document 206 is framed-in to the image capturing area 205 from the front side, classification areas 1 to 4 may be set according to the frame-out directions. As shown in FIG. 16B, in a case where the document 206 is framed-in to the image capturing area 205 from the right side, classification areas 4 to 8 may be added. Similarly, FIGS. 16C and 16D show classification areas in a case where the document 206 is framed-in to the image capturing area 205 from the left side and the back side, respectively.

Incidentally, as described in the second embodiment, in a case where the frame-in direction corresponds with the frame-out direction, cancellation processing may be assigned.

FIG. 17 shows an exemplary classification information management table in accordance with the present embodiment.

As classification information, information about frame-in and frame-out directions are retained, and group IDs are assigned according to the combinations of the two directions.

In accordance with the above-described processing, the number of classification areas may be increased by using frame-in and frame-out directions.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178410, filed Aug. 10, 2012, which is hereby incorporated by reference herein in its entirety.

What is claimed is:

1. An image processing apparatus comprising:
    an acquisition unit configured to acquire image data obtained by capturing a document placed in an image capturing area; and
    a classification unit configured to classify the acquired image data according to at least one of a direction to which the document is framed-out from the image capturing area and a direction from which the document is framed-in to the image capturing area.

2. The image processing apparatus according to claim 1, further comprising a generation unit configured to generate an output file in a predetermined data output format from the image data classified by the classification unit.

3. The image processing apparatus according to claim 2, wherein the predetermined data output format used by the generation unit includes at least one of a format for outputting a separate file for each group of classified documents, a format for merging classified documents into a single file and splitting the file by chapters or bookmarks, and a format for splitting classified image data across folders for outputting.

4. The image processing apparatus according to claim 1, further comprising a detection unit configured to detect timing at which the document gets still in the image capturing area,
    wherein the acquisition unit is configured to acquire the image data by capturing the image of the document on the basis of the timing at which the document gets still.

5. The image processing apparatus according to claim 1, further comprising a detection unit configured to detect the frame-out direction of the document, on the basis of image data captured and obtained while the document is framed-out, and image data captured and obtained in a state with no document placed in the image capturing area.

6. The image processing apparatus according to claim 1, wherein the frame-out direction is any one of right, left, front, and back sides of the image capturing area.

7. The image processing apparatus according to claim 1, wherein the classification unit is configured to give the image data an identifier according to the frame-out direction to classify the image data.

8. The image processing apparatus according to claim 1, wherein an identifier is assigned to the frame-out direction in advance, and the classification unit is configured to classify the image data according to the assigned identifier.

9. The image processing apparatus according to claim 1, wherein the classification unit is configured to classify the image data in a case where the frame-in direction and the frame-out direction are different.

10. The image processing apparatus according to claim 1, wherein the classification unit is configured not to classify the image data in a case where the frame-in direction and the frame-out direction are the same.

11. The image processing apparatus according to claim 1, wherein the classification unit is configured to classify the image data into groups according to a combination of the frame-in direction and the frame-out direction.

12. The image processing apparatus according to claim 1, wherein the frame-in direction is any one of right, left, front, and back sides of the image capturing area.

13. The image processing apparatus according to claim 1, further comprising an output unit configured to generate folders for respective groups into which the image data is classified by the classification unit and output the image data to the generated folders.

14. The image processing apparatus according to claim 1, further comprising an output unit configured to merge the image data classified by the classification unit into a single file for each group.

15. An image processing method comprising:
    an acquisition step of acquiring image data obtained by capturing an image of a document placed in an image capturing area; and
    a classification step of classifying the acquired image data according to at least one of a direction to which the document is framed-out from the image capturing area and a direction from which the document is framed-in to the image capturing area.

16. A non-transitory computer readable storage medium storing a program which causes a computer to function as the image processing apparatus according to claim 1.

* * * * *